Patented July 6, 1954

2,683,102

UNITED STATES PATENT OFFICE 2,683,102

ELECTROLYTE FOR ALKALINE STORAGE BATTERIES

Roger S. Coolidge, New York, N. Y.

No Drawing. Application March 23, 1951, Serial No. 217,291

13 Claims. (Cl. 136—154)

This invention relates to a novel structure of an electrical battery and to an improved electrolyte for this battery. More in particular, the invention relates to a battery which functions successfully at sub-zero temperatures, and especially the invention relates to an improved alkaline electrolyte for such batteries for operating at relatively low temperatures.

It is well known that many of the present electric batteries which include sodium hydroxide or potassium hydroxide as one of the ingredients of the electrolyte does not efficiently operate at relatively cold temperatures, and especially in sub-zero temperatures.

It is the desire of this invention to provide a battery which operates successfully at relatively cold temperatures, and at any selected sub-zero temperature. It has been found that such effective operation of a battery having an alkaline electrolyte can be greatly improved by substituting, in toto or in part in the electrolyte, the sodium hydroxide or potassium hydroxide by rubidium hydroxide or cesium hydroxide, or by mixtures thereof.

Also, it is possible in this invention to prepare the electrolyte with a certain amount of rubidium hydroxide or cesium hydroxide or combinations of them in it so as to have the battery give excellent operating results at a specific low temperature. Such an electrolyte may or may not also have some sodium hydroxide or potassium hydroxide in it.

In the experimental and commercial development of electric storage batteries, great difficulties have been encountered in their cold weather operation, particularly at sub-zero temperatures. The capacity of such batteries to function efficiently decreases very markedly with fall in temperature, so that at —65° F., most storage batteries are apt to be practically useless.

This invention in general is based on the discovery of Ruben and others that broadly the usual alkaline electrolyte used in such types of storage batteries, such as an electrolyte containing potassium hydroxide as its principal ingredient, may have substituted for such hydroxide in whole or in part other hydroxides of metals belonging to the same Period I A of the Periodic Classification of Elements. However, in some respects the hydroxides of Period I A metals in aqueous solutions tend to have improving electrolytic qualities of particular advantage for low temperature use. These qualities tend to improve in going from one hydroxide to another in the order of their molecular weights, namely, LiOH, NaOH, KOH, RbOH, CsOH, and consist in part of increasing conductance; decreasing degree of ionic hydration, ionic heat of hydration, and ionic viscosity resulting in greater percentage capacity at lower temperatures; also lowering eutectic freezing point; increasing activity coefficients; and other advantageous features. These increasingly advantageous qualities are also desirable for ordinary use of electrolytes in electric batteries, because they provide the means for a more active performance and efficiency of the battery.

In view of these particular advantages of the various alkali hydroxides in the order of their magnitude, the preferred amount of rubidium or cesium hydroxide employed in this invention is a complete substitution of cesium hydroxide (rather than rubidium hydroxide, which is more expensive and less active) for the usual potassium hydroxide now employed in an alkaline electrolyte.

However, a less than complete substitution may also be employed in accordance with this invention as described in the preceding paragraph, particularly when it is preferred to sacrifice some of the maximum advantages obtainable by this invention in favor of a proportionate lowering of cost of the electrolyte.

As to the preferred concentration of the rubidium or cesium hydroxide in the aqueous solution of the electrolyte of this invention, this concentration may lie between 5% and 60% by weight of the electrolyte solution. However, more preferably this concentration should be at least equal to the mol fraction of the potassium or other hydroxide it replaces, and, if greater, not more should be added than that required to prevent freezing at a selected sub-normal temperature contemplated for operation of the electrolyte of the battery. In substituting the rubidium hydroxide or cesium hydroxide, or the combination of them, for any of the other hydroxides like potassium, it is possible that a complete substitution can be made.

In employing the rubidium hydroxide or cesium hydroxide or a mixture of both in the electrolyte, it is desirous to include sufficient percentage of either or both of these hydroxides in the total solution of the electrolyte to obtain successful operation of the battery and to prevent freezing at sub-zero temperatures. For example, in the event it is desirable to have the battery work in good practical manner, for instance, at —50° C., all or part of the normal potassium hydroxide in the solution may be substituted by a desired percentage concentration of the rubidium hydroxide or cesium hydroxide or a mixture thereof. The concentration of rubidium or cesium hydroxide to be added to the electrolyte or substituted therein, may be varied depending upon the desired efficiency of operation at the above temperature, or at a selected temperature.

It will be seen from the foregoing presentation that there is an electrolyte material which employs the hydroxides of rubidium and cesium in the electrolyte of any type of battery, be that battery of the Edison type or of the nickel-cadmium type, or any other type of alkaline battery. It will also be seen that an improved electric battery is provided that successfully functions at low temperatures. In addition, it will be noted that the electrolyte may be a combination of rubidium hydroxide, or cesium hydroxide, with a solvent, such as, for example, water; or may be a mixture of rubidium hydroxide and cesium hydroxide with the water; or the electrolyte may be composed of a desirable amount of water with several alkali metal hydroxides, and in which there may be some rubidium hydroxide or cesium hydroxide or a mixture of the rubidium and cesium hydroxides. When the selected temperatures are not too low, it is quite possible the electrolyte will contain rubidium and cesium hydroxides and some potassium, and possibly some sodium hydroxides.

It will be understood that various modifications and changes may be made in the preferred form of the invention herein, and such modifications and changes are to be understood as part of this invention, as outlined in the following claims.

The invention claimed is:

1. A storage battery electrolyte having rubidium hydroxide as the major alkali hydroxide constituent therein.

2. A storage battery electrolyte having cesium hydroxide as the major alkali hydroxide constituent therein.

3. A storage battery electrolyte having rubidium hydroxide and cesium hydroxide wherein the total of said hydroxides constitutes the major alkali hydroxide constituent in said electrolyte.

4. An electric storage battery electrolyte having approximately 5 to 60% by weight of rubidium hydroxide therein.

5. An electric storage battery electrolyte having approximately 5 to 60% by weight of cesium hydroxide therein.

6. An electric storage battery electrolyte having a mixture of rubidium hydroxide and cesium hydroxide totalling between 5 and 60% by weight of the electrolyte.

7. A rechargeable electric storage battery of the nickel-cadmium or nickel-iron type, comprising a positive electrode, a negative electrode, battery active material carried in each electrode, and an electrolyte composed of a solvent, rubidium hydroxide, cesium hydroxide, and a quantity of potassium hydroxide less than the amount of either the rubidium hydroxide or the cesium hydroxide.

8. A rechargeable electric storage battery of the nickel-cadmium or nickel-iron type, comprising a negative electrode, a positive electrode, and an alkalin electrolyte having cesium hydroxide as the major alkali hydroxide constituent of said electrolyte.

9. A rechargeable electric storage battery of the nickel-cadmium or nickel-iron type, comprising a negative electrode, a positive electrode, and an alkalin electrolyte having rubidium hydroxide as the major alkali hydroxide constituent of said electrolyte.

10. A rechargeable electric storage battery of the nickel-cadmium or nickel-iron type, comprising a negative electrode, a positive electrode, and an alkalin electrolyte having a total of cesium hydroxide and rubidium hydroxide constituting the major alkali hydroxide constituent in said electrolyte.

11. A rechargeable electric storage battery of the nickel-cadmium or nickel-iron type, comprising a negative electrode, a positive electrode, and an electrolyte having an alkali metal hydroxide content thereof up to approximately 60% by weight of said electrolyte, said alkali metal hydroxide content having rubidium hydroxide substituted for said alkali metal hydroxide in a manner equal to the mol fraction of the substituted hydroxide.

12. A rechargeable electric storage battery of the nickel-cadmium or nickel-iron type, comprising a negative electrode, a positive electrode, and an electrolyte having an alkali metal hydroxide content thereof up to approximately 60% by weight of said electrolyte, said alkali metal hydroxide content having cesium hydroxide substituted for said alkali metal hydroxide in a manner equal to the mol fraction of the substituted hydroxide.

13. A rechargeable electric storage battery of the nickel-cadmium or nickel-iron type, comprising a negative electrode, a positive electrode, and an electrolyte having an alkali metal hydroxide content thereof up to approximately 60% by weight of said electrolyte, said alkali metal hydroxide content having a total of cesium hydroxide and rubidium hydroxide substituting for an alkali metal hydroxide in said electrolyte in a manner equal to the mol fraction of the substituted hydroxides.

References Cited in the file of this patent

UNITED STATES PATENTS

| Number | Name | Date |
|---|---|---|
| 1,137,226 | Manchester | Apr. 27, 1915 |
| 1,219,074 | Bronsted | Mar. 13, 1917 |
| 1,285,054 | French et al. | Nov. 19, 1918 |
| 1,863,791 | Heise | June 21, 1932 |
| 2,257,129 | Ruben | Sept. 30, 1941 |
| 2,422,045 | Ruben | June 10, 1947 |
| 2,463,316 | Ruben | Mar. 1, 1949 |
| 2,463,565 | Ruben | Mar. 8, 1949 |
| 2,536,696 | Ruben | Jan. 2, 1951 |
| 2,554,447 | Sargent | May 22, 1951 |

FOREIGN PATENTS

| Number | Country | Date |
|---|---|---|
| 379,141 | Great Britain | Aug. 25, 1932 |